Sept. 15, 1959    H. B. HOLTHOUSE, SR., ET AL    2,904,107
FLUID METERING DEVICE
Filed Dec. 20, 1954    3 Sheets-Sheet 1
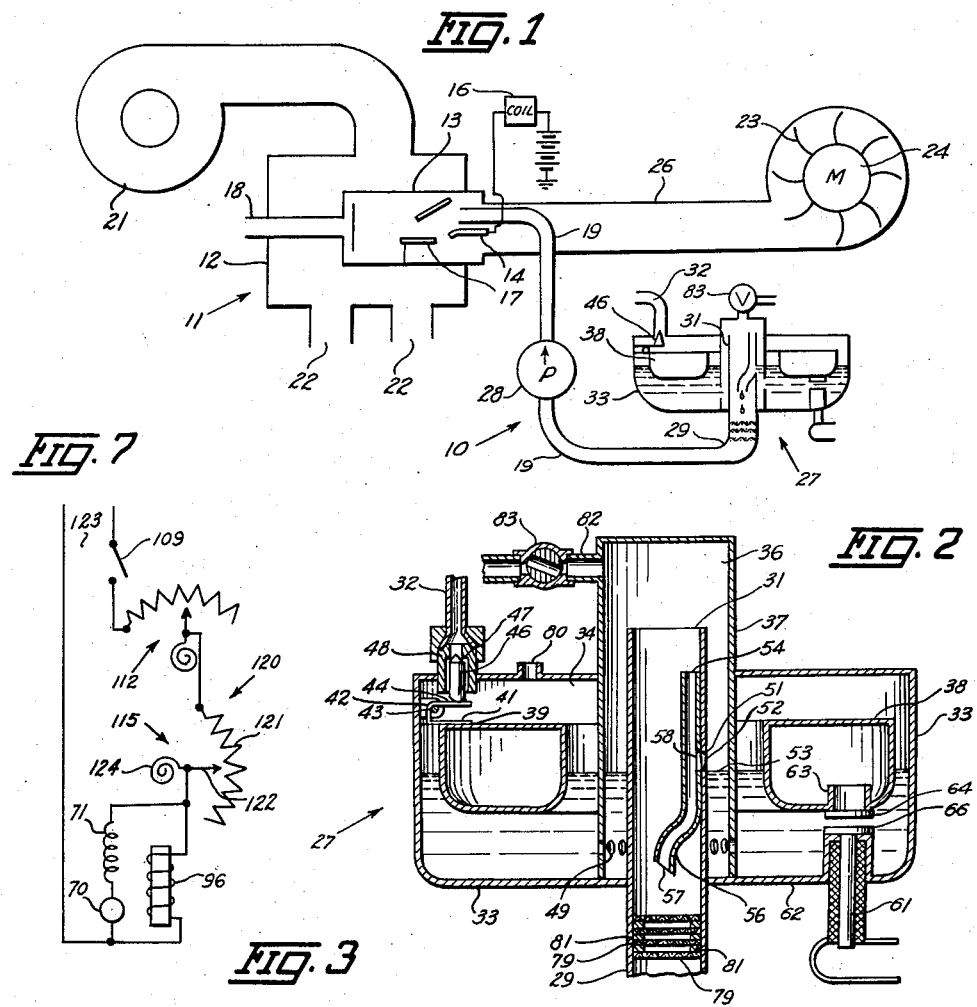
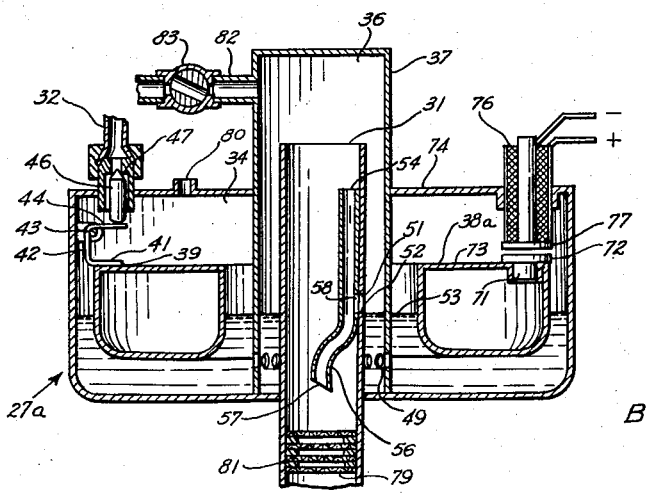
INVENTORS.
HARRY B. HOLTHOUSE, SR.
HARRY B. HOLTHOUSE, JR.
BY
ATTORNEY.

INVENTORS.
HARRY B. HOLTHOUSE, SR.
HARRY B. HOLTHOUSE, JR.

BY *Rudolph L. Parnell*

ATTORNEY.

Sept. 15, 1959     H. B. HOLTHOUSE, SR., ET AL     2,904,107
FLUID METERING DEVICE Filed Dec. 20, 1954                                      3 Sheets-Sheet 3

INVENTORS.
HARRY B. HOLTHOUSE, SR.
HARRY B. HOLTHOUSE, JR.
BY Rudolph L. Lowell
ATTORNEY.

United States Patent Office 2,904,107
Patented Sept. 15, 1959

2,904,107

FLUID METERING DEVICE

Harry B. Holthouse, Sr., Allegan, Mich., and Harry B. Holthouse, Jr., Chicago, Ill.

Application December 20, 1954, Serial No. 476,481

2 Claims. (Cl. 158—38)

This invention relates generally to fluid supply systems and more particularly to a fluid metering device for use in such systems. This application is a continuation-in-part of our prior co-pending application Serial Number 88,601 filed April 20, 1949, now Patent Number 2,698,744.

An object of this invention is to provide an improved fluid metering device.

A further object of this invention is to provide a float operated and electrically controlled fluid metering unit which is usable in substantially any fluid supply system in which a controlled supply of fluid is desired.

Another object of this invention is to provide a fluid metering unit which is adapted for use with a liquid fuel burner supplied with combustion air by a variable speed blower with the metering unit being connected with the blower to supply fuel to the burner in response to speed variations of the blower and thereby maintain a desired air to fuel ratio to the burner.

A still further object of this invention is to provide a fluid supply system in which a variable control means is connected in circuit with an electro magnetically operated fluid metering device for varying the fluid flow from the metering device in response to operation of the control device.

Yet another object of this invention is to provide a fluid metering device which is simple in construction, economical in cost and efficient in operation to supply fluid in variable amounts in response to operation of a control device.

Further objects, features and advantages of this invention will become apparent from the following description when taken in connection with the accompanying drawing, in which:

Fig. 1 is a diagrammatic view of a fuel supply system for a liquid fuel burner which system includes the fluid metering device of this invention;

Fig. 2 is a longitudinal sectional view of the fluid metering unit included in the fuel supply system shown in Fig. 1;

Fig. 3 is a longitudinal sectional view, illustrated similarly to Fig. 2, showing a modified form of fluid metering unit;

Fig. 7 is a diagrammatic showing of a modified form of the electrical circuit shown in Fig. 6;

Figure 4:
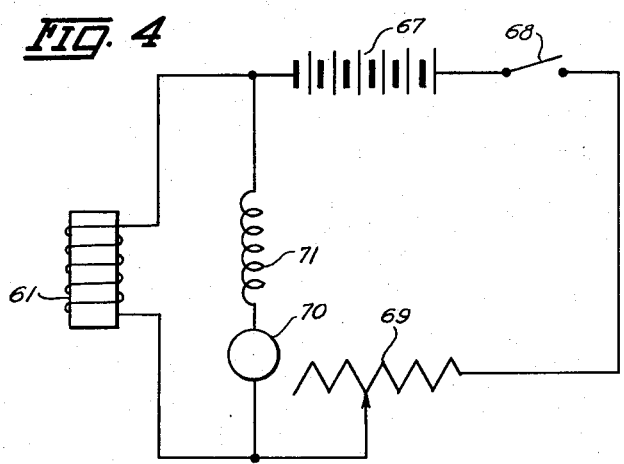
Fig. 4 is a diagrammatic showing of an electrical circuit which is applicable to the fluid metering units shown in Figs. 2 and 3.

With reference to the drawing, the fuel supply system shown diagrammatically at 10 in Fig. 1, is illustrated in assembly relation with a space heater 11 which includes a burner 13 arranged within a casing 12. A fuel and air mixture, fed to the burner 13 through a supply line 19, in a manner to be hereinafter disclosed, is ignited by an arc discharged between a hot electrode 14 connected with a coil 16, and a grounded electrode 17, with the products of combustions from the burner 13 being discharged through an exhaust outlet 18. An air blower 21 moves air through the casing 12 and about the burner 13 for discharge as heater air through the outlets 22 to the desired point of use.

Air for combustion is supplied to the burner 13 by a fan 23 connected to the burner 13 by an air passage 26, and driven by a motor 24.

The fuel supply system 10 includes the fluid metering unit 27 of this invention, which is hereinafter referred to as a fuel metering unit by virtue of its assembly in the fuel supply system 10, which communicates with the fuel-air supply line 19 and a pump 28 positioned in the line 19. The inlet end 29 of the line 19 is connected to an upright tube 31 (Figs. 1 and 2) arranged within the metering unit 27, which is supplied with fuel from a suitable source through a supply line 32.

The fuel metering unit 27 (Figs. 1 and 2) includes a casing or housing 33 which is divided into a pair of separate fuel chambers 34 and 36 by the provision of an upright tubular partition member 37 arranged centrally of the casing 33 about the tube 31.

Arranged within the fuel-chamber 34, and about the fuel chamber 36, is a float 38 of what might be termed a "donut shape." The float 38 is secured at 39 to one arm 41 of a bell crank 42 which is pivoted at 43 on the side wall of the casing 33. A second arm 44 of the bell crank 42 is engageable with a valve 46 adapted for seating engagement with a valve seat 47 formed on a fuel supply line 32.

The float 38 is thus movably supported for up and down movement within the fuel chamber 34, and with this movement, through the arms 41 and 44 of the bell crank 42, actuating the valve 46 to maintain a predetermined level of fuel within the casing 33. The partition member 37 is formed with a series of fuel openings 49 adjacent the lower end thereof, and below the normal level of fuel in the chambers 34 and 36, so that the fuel is permitted to flow from the chamber 34 into the chamber 36 to the same level as the fuel in the chamber 34.

The upright tube 31, arranged within the chamber 36, in a concentric relation with the partition member 37, is formed with a longitudinally extended slot 51, the lower end 52 of which terminates slightly above the level of the fuel in the chambers 34 and 36, which level is indicated at 53. The lower end of the tube 31 is connected with the inlet end 29 of the air-fuel line 19, on the inlet side of pump 28, so that the line 19 and the tube 31 constitute extensions of each other.

Arranged within the tube 31 (Fig. 2) at a position opposite the slot 51 therein, and secured to the tube 31, is a metering and fuel supply tube 54 having a laterally offset lower end 56 which terminates in a discharge portion 57 arranged in a co-axial relation with the fuel supply tube 31.

A metering slot 58 in the tube 54 is open to the slot 51 in the tube 31 and is substantially co-extensive in length with the slot 51.

So long as fuel within the chambers 34 and 36 is at or below the fuel lever 53, no fuel is admitted into the metering tube 54. However, upon raising of the level of the fuel in the chamber 36, above the fuel level 53, and in turn above the lower end of the metering slot 51, fuel flows through the slots 51 and 58 and into the metering and supply tube 54 in an amount proportional to the area of that portion of the slot 51 included between the normal fuel level 53 and the raised fuel level.

The metering of the fuel to the slot 51 in an amount to obtain a desired air and fuel ratio to the burner 12 is accomplished by an electro magnet 61 arranged in the bottom wall 62 of the casing 33 at a position opposite a pole shoe 63, having a pole 64 formed of soft iron, and carried on the underside of the float 38. It is apparent that the pole shoe 63 may be omitted by merely forming the float 38 with a magnetic portion of iron or the like at a position opposite the electro magnet 61.

As shown in Fig. 4, the circuit for the electro magnet 61 includes a battery 67, a switch 68, and a variable resistance or rheostat 69, which may be under the control of a heat responsive element in the space being heated, connected in series with the armature 70 and field 71 for the air supply motor 24. The electro magnet 61 is connected across, or in parallel with, the motor 24. The effective voltage applied to the electro magnet 61 is thus variable in direct response to the speed of the combustion air motor 24, with this voltage being increased with a decrease in the variable resistance 69. Thus, in response to the supply of combustion air to the burner 13, as provided by the blower 23, the float 38 is moved downwardly, by the magnetic attractive force between the poles 64 and 66, in response to an increase in speed of the motor 24, whereby to provide for a predetermined metered fuel flow from the chamber 36 through the slots 51 and 58 and into the metering tube 54, as a result of the upward displacement of fuel in the chamber 34 by the downward movement of the float 38.

The fuel admitted to the metering and supply tube 54 flows downwardly therethrough by the action of gravity and falls from the discharge portion 57 in a small stream or in successive drops. To facilitates the burning of this fuel in the burner 13, the lower end of the tube 31 is provided with a series of stacked small mesh screens 79 (Fig. 2) which are vertically spaced by a series of spacer washers 81 arranged between the screens 79. The fuel from the discharge portion 57, on falling upon the screens 79, tends to spread or distribute itself over the screens by capillary action. The fuel thus spread over the screens is drawn therethrough by the action of the pump 28 which preferably is of a slow speed, low pressure reciprocating or diaphragm type.

This cooperative action of the pump 28 and screens 79 results in the fuel being changed into a bubble or foam form. Since the fuel chamber 36 is open to the atmosphere, through an air line 82 (Fig. 2), the fuel is intimately mixed with air prior to its entry into the pump 28, by virtue of the air being enclosed within the bubbles and surrounding the bubbles. This bubble form of the fuel is not disturbed by the pump 28, by virtue of its low speed and low pressure action and the construction of the air-fuel line 19 without any restrictions. As a result, the largest part of the fuel admitted to the burner 13 is in a bubble form.

The drawing or suction action of the pump 28 can be varied if desired, by the provision of a valve 83 connected in the air line 82 from the fuel chamber 36. When the chamber 36 is not freely open to the atmosphere as by partial closing of the valve 83, the action of the pump creates a partial vacuum in the chamber 36 which increases the rise of fuel in this chamber above a normal rise which would be effected only by the fuel level in the fuel chamber 34. A regulation of the valve 83 thus provides for a variation in the effective suction action of the pump 28, which in turn varies the effective action of the fuel level in the fuel chamber 34 relative to the fuel rise in the chamber 36. As a result the metering range of the unit 27 is not only increased, but the metering action is made flexible for the handling of fuels of different viscosities. Stated otherwise, the flow of fuel through the metering slot 51 can be accelerated or reduced, by varying the suction action of the pump 28 so as to correspond with the rate of fuel rise in the fuel chamber 36.

It is seen, therefore, that the width of the fuel metering slot 51 and the height of the fuel level within the chamber 36, above the normal fuel level 53, determines the amount of fuel entering the metering and supply tube 54. During this metering action, the fuel level in the chamber 36 is maintained at a predetermined level, above the level 53, by the action of the float 38 and the valve 46 which function cooperatively to compensate for the fuel flowing into the tube 54.

The fuel metering unit 27a, shown in Fig. 3, is similar in all respects to the fuel metering unit 27 except that the float 38a is moved up and down by a magnetic repulsion rather than magnetic attraction. The float 38a carries, at the top side 73 thereof, a magnet 71 having a pole 72. Extended through the casing top wall 74 is an electro magnet 76 having a pole 77 of a like polarity relative to the pole 72, and arranged opposite the pole 72.

The electrical system for the fuel-metering system 27a is similar in all respects to the circuit shown in Fig. 4 for the metering unit 27 except for the substitution of the electro magnet 76 for the electro magnet 61 and the substitution of the magnet 71 for the pole shoe 63. As a result of the latter substitution, the electrical system for the unit 27a requires direct current, while it is apparent that a source of alternating current may be substituted for the battery 67 in the electrical system for the unit 27.

Because the poles 72 and 77 are of a like polarity, an increase in the voltage applied to the electro magnet 76 increases the flux repulsion of the electro magnet 76 whereby to provide for a greater downward movement of the float 38a in response to a voltage increase to the motor 24 and in turn to the speed of operation of the blower motor 24. Since the downward movement of the float 38a displaces a corresponding amount of fuel from the chamber 34 the level of fuel in the chamber 36 is correspondingly raised to in turn provide for an increase in the level of the fuel in chamber 36. The float 38a is thus utilized in conjunction with the permanent magnet 71 and the electro magnet 76 to raise the liquid level in the chamber 36 for passage through the metering slot 51, in response to the supply of combustion air to the burner 13.

Repulsion of the permanent magnet 71 and float 38a by the electro magnet 76, has the same effect as increasing the weight of the float 38a, so that the fuel level in the chamber 36 is raised in direct proportion to the fuel displaced by the float, while maintaining the float in a position to hold open the valve 46. The repelling flux in the electro magnet 76 is proportional to the applied voltage and the current in the magnet winding. Since this applied voltage and current varies directly with the voltage and current in the blower motor 24, the fuel level in the float chamber 34 will rise and fall in direct response to the speed of the blower whereby the fuel admitted to the slot 51 will be metered in an amount to give a desired air to fuel ratio at the burner 13.

Figure 5:
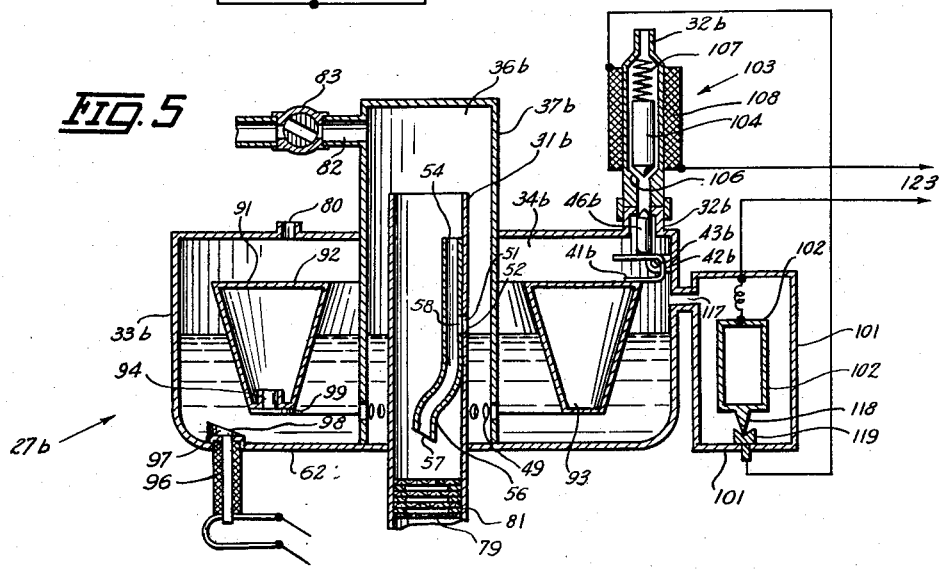
Fig. 5 is a longitudinal sectional view, illustrated similarly in Figs. 2 and 3, showing another modified form of fluid metering unit having an auxiliary overflow float control.

In the modified form of fuel metering unit 27b, shown in Fig. 5, a float 91 surrounds the fuel metering tube 31b and is hinged at its upper end to the housing 33b by a bell crank 42b, in a manner similar to the floats 38 and 38a for the fuel metering units 27 and 27a, respectively. The float 91 can thus move up and down to open and close the valve 46b to maintain a constant fuel level determined by the weight and displacement of the float 91. The float 91 is uniformly tapered, having its top end 92 of a larger diameter and area than its lower end 93, to progressively increase the displacement of fuel in the chamber 34b as the float 91 is moved downwardly. A pole shoe 94, similar in all respects to the pole shoe 63 carried by the float 38 for the metering device 27, on the bottom side of the float 91, is arranged opposite an electro magnet 96 mounted in the bottom wall 62b of the housing 33b. The electro magnet 96 has a pole 97 which has its exposed face 98 inclined downwardly and inwardly relative to the float 91, and arranged to one side of the pole 99 for the shoe 94. As a result, the pole 99 cannot contact the pole 97, so that there is no danger of the residual magnetism in the pole 97 holding the float 38b in a down position, as might occur if the shoe 99 and pole 97 contacted each other. Likewise, it is apparent that the pole shoe 94 may be omitted from the unit 27b by merely forming a bottom portion of the float 38b of a magnetic material.

The operation of the fuel metering unit 27b is substantially the same as the operation of the devices 27 and 27a, with the tapered construction of the float 91 compensating for the increased pull exerted on the pole 99 by the electro magnet 96, as the distance between the poles 97 and 99 decreases. In other words, the progressively increased flux density which increases inversely with the square of the distance between the poles 97 and 99, is compensated by the progressively increased displacement of the float 91. Thus, the float 91 can be moved steadily downwardly and maintained in a spaced relation with the electro magnet pole 97, without any tendency of the float 91 to jump between a raised position and a lowered position adjacent the pole 97.

Arranged to one side of the float housing 33b, is an auxiliary float housing 101 for a metal float 102, which is connected in circuit with a solenoid valve 103 arranged in the fuel supply line 32b. The valve 103 includes a valve member 104 arranged above a valve seat 106 and biased toward the seat 106 by a spring 107. On energizing of the solenoid 108 for the valve 103, the valve member 104 is moved off the seat 106 to an open position and on de-energization of the solenoid 108, the spring 107 moves the valve member 104 onto the seat 106 closing the valve 103.

Figure 6:
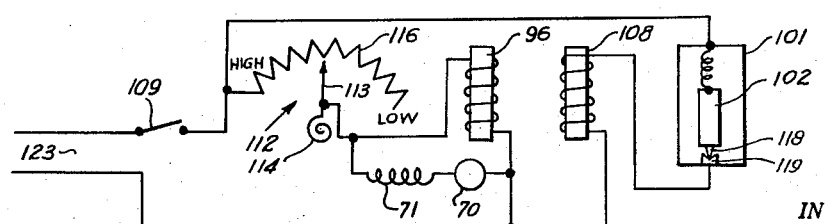
Fig. 6 is a diagrammatic showing of the electrical circuit for the fluid metering unit and overflow control shown in Fig. 5.

As shown in Fig. 6, the float 102 which is formed of a conducting metal, is connected in series with the solenoid 108, a manual switch 109 and a source fo current 123. A room thermostat 112, of the type having an arm 113 actuated by a bi-metal heat responsive spiral 114 to regulate the current through a rheostat or variable resistance 116, is connected in series with the electromagnet 96. The armature 70 and field 71 for the fan motor 24 are connected in parallel with the electromagnet 96 and in series with the thermostat 112. It can thus be seen (Fig. 6), that the float 102 and solenoid 108 are connected in a circuit separate from the circuit which includes the thermostat 112, motor 24 and solenoid 96, with the exception being that the shut down switch 109 is common to both circuits.

In the operation of the fuel metering unit 27b, when the room thermostat 112 calls for heat, a circuit is completed through the electro magnet 96, with the amount of current applied to the electro magnet 96 being dependent on the position to which the arm 113 is moved on the variable resistance 116 by the bi-metal spiral 114. On energization of the electro magnet 96, the float 91 is pulled downwardly in the float chamber 34b to supply fuel to the metering tube 54 in amounts proportional to the amount of current supplied to the electro magnet 96. With the arm 113 for the thermostat 112 on the "low" end of the rheostat 116, insufficient current is supplied to the electro magnet 96 for the motor 24 so that the flow of fuel to the metering tube 54 is shut off. Likewise, by virtue of the series connection of the motor armature and field 70 and 71, respectively, with the thermostat 112, the speed of the motor 24 is varied in accordance with the requirements of the thermostat 112.

The thermostat 112 thus functions to increase or decrease the magnetic pull of the electro magnet 96 on the float 91 to thus supply fuel to the burner 13 in amounts dependent on the heat requirements of the space being heated.

Also, the amount of air supplied to the burner 13 by the blower 23 is dependent on the thermostat 112 to thus provide for a predetermined desired proportion of fuel and air for combustion at the burner 13. An even temperature of the space being heated is thus readily obtained since after an initial warm-up period, the thermostat 112 will move only in small increments modulating the supply of fuel to the burner in small amounts to maintain an even temperature.

Should the inlet valve 46b on the bell crank 42b stick for any reason, the level of the fuel in the chamber 34b immediately rises and fuel overflows into the auxiliary housing 101 through an opening 117 in the casing 33b. When sufficient fuel has overflowed into the housing 101 to lift the float 102 a contact 118 on the lower end thereof is moved upwardly out of engagement with a stationary contact 119 at the lower end of the housing 102. On breaking of the contacts 118 and 119, the circuit for the solenoid valve 103 is broken by virtue of the series connection of the float 102 and the solenoid 108 (Fig. 6). The valve member 104 is moved onto the valve seat 106 by the spring 107 to prevent further inflow of fuel into the housing 33b until the auxiliary housing 101 has been emptied of fuel and the inlet valve 46b repaired.

It is seen, therefore, that the auxiliary housing 101, and the series connection of the float 102 therein, with the solenoid valve 103 provides for a safe operation of the fuel metering device 27b without any danger of fuel overflowing the housing 33b and flooding through the air vent 80. The contacts 118 and 119 constitute a switch which is opened by raising movement of the float 102 to thereby de-energize the solenoid 108 and close the valve 103 to shut off the supply of fuel to the chamber 34b.

It is to be understood, of course, that the fuel metering device 27b (Fig. 5) is also useable, with or without the auxiliary float control, in the circuit shown in Fig. 4 in an identical manner as that heretofore described for the fuel metering devices 27 and 27a (Figs. 2 and 3) respectively.

In Fig. 7, a modified circuit 120 for controlling the operation of the fuel metering unit 27b is shown, it being understood however, that either of the units 27 or 27a may also be connected in such circuit. The circuit 120 is identical to the circuit shown in Fig. 6 for the room thermostat 112, electro magnet 96, and the armature 70 and field 71 for the motor 24, except that the circuit 120 also includes an outdoor thermostat 115 connected in series with the room thermostat 112. The outdoor thermostat 115 is of variable resistance type, having a variable resistance 121 controlled by an arm 122 which is in turn actuated by a temperature responsive element, illustrated as a bi-metal spiral 124.

The operation of the outdoor thermostat 115 is identical with that previously described for the room thermostat 112. Thus, as the outdoor temperature rises the arm 122 is actuated to increase the effective resistance of the variable resistance 121 and thereby decrease the current applied to the electro magnet 96 to in turn decrease the fuel supplied by the metering unit 27b. The amount of fuel supplied to the burner 13 is thus controlled in response to both room and outdoor temperatures by the room and outdoor themostats 112 and 115, respectively.

From a consideration of the above description, it is seen that this invention provides a fuel supply system 10 in which a fuel and air mixture is supplied to a burner 13 in an amount proportional to the amount of combustion air supplied by a fan 23. Any one of the fuel metering devices 27, 27a and 27b are useable in the system 10 to supply the desired air and fuel mixture to the burner 13. Also, the fuel metering devices 27, 27a and 27b are connectible in circuit with a room thermostat 112 (Fig. 6), and, if desired, an outdoor thermostat 115 (Fig. 7), to regulate the amount of fuel and air supplied to the burner in accordance with the heat requirements of the space being heated.

Figure 8:
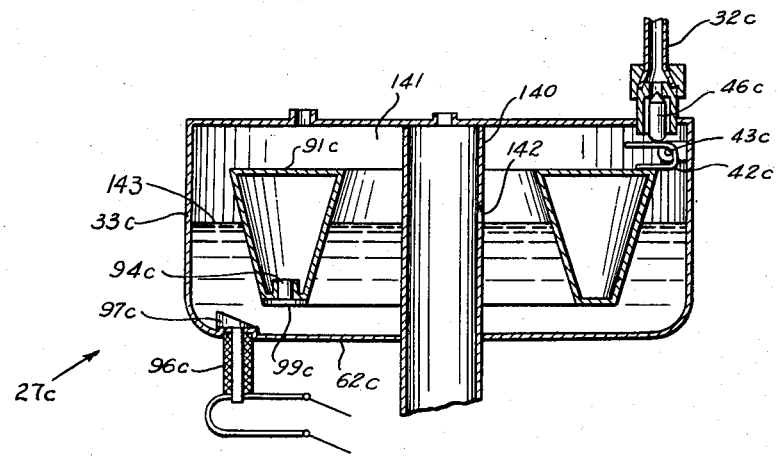
Fig. 8 is a longitudinal sectional view, illustrated similarly to Figs. 2, 3 and 5, of another modified form of fluid metering unit.

It is apparent from the foregoing description of the metering units 27, 27a and 27b, that such units are useable in a gravity feed system for substantially any fluid. Accordingly, a modified form of fluid metering unit 27c, adapted for use in a gravity feed system, is illustrated in Fig. 8. The unit 27c is identical with the unit 27b (Fig. 5), except for the omission of some of the elements of the unit 27b, and like numerals are therefore used to designate like structure in the units 27b and 27c.

In the fluid metering unit 27c, the casing 33c encloses a single fluid chamber 141 which surrounds an upright fluid metering tube 140 formed with an upright metering slot 142 arranged slightly above the normal level 143 of fuel in the chamber 141. In use, metering tube 140 communicates with any suitable means for conveying fluid from the tube 140 to the desired point of use. A uniformly tapered float 91c surrounds the metering tube 140 and is hinged at its upper end to the housing 33c by a bell crank 42c, as in the unit 27b. A pole shoe 94c carried on the bottom side of the float 91c is arranged opposite an electro magnet 96c mounted in the bottom wall 62c of the housing 33c. The electro magnet 96c has a pole 97c which is arranged in a clearance relation with the pole shoe 94c, as in the metering device 27b.

Figure 9:
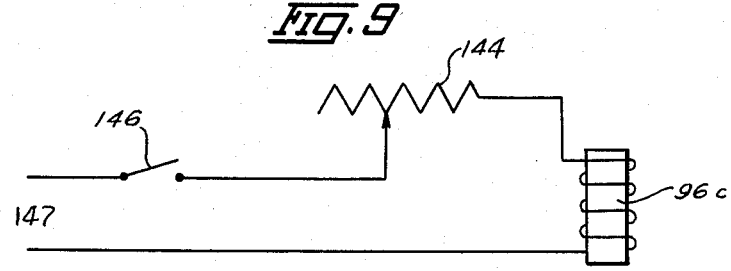
Fig. 9 is a diagrammatic showing of a modified electrical circuit which is applicable to the fluid metering units shown in Figs. 2, 3, 5 and 8.

The unit 27c may be used in any of the circuits shown in Figs. 4, 6 and 7 and is also useable in the circuit shown in Fig. 9 as are the metering devices 27, 27a and 27b. As shown in Fig. 9, the electro magnet 96c is merely connected in series with a variable resistance or rheostat 144, which may be manually or automatically controlled, and a switch 146.

In the operation of the metering unit 27c connected in the circuit shown in Fig. 9, in which the source of current is indicated at 147 and may be either D.C. or A.C., the amount of current applied to the electro magnet 96c is controlled by the adjustment of the rheostat 144. The float 91c is then moved downwardly in the chamber 141 a distance dependent on the pull exerted on the shoe 94c by the electro magnet shoe 97c, which is in turn dependent on the current applied to the electro magnet 96c. As a result, the amount of fuel supplied to the metering tube 140 is proportional to the amount of current applied to the electromagnet 96c which is in turn dependent on the adjustment of the rheostat 144.

Thus, the rheostat 144 may be adjusted to adapt the unit 27c for fluids of varying viscosities. If the unit 27c is used with a pot type burner, the rheostat 144 may be under the control of a bimetal heat responsive element so that the fuel supplied to the burner is dependent on the heat requirements of a space being heated. Also, the unit 27c could obviously be connected with both indoor and outdoor thermostats and if desired a manually controlled rheostat.

Although the invention has been described with respect to several embodiments thereof, it is to be understood that it is not to be so limited since changes can be made therein which are within the full intended scope of this invention as defined by the appended claims.

We claim:
1. A fluid metering unit comprising a housing having a fluid chamber therein, a fluid supply line communicating with said chamber for supplying fluid thereto in amounts sufficient to maintain a predetermined quantity of fluid in the chamber, a fuel metering member operatively associated with said chamber for receiving fluid therefrom in amounts dependent on the level of the fluid therein, a float member movably mounted in said chamber for varying the level of the fluid therein, a solenoid valve arranged in said supply line and adapted to be closed when no current is applied thereto, an auxiliary housing in fluid communication with said chamber when the level of the fluid therein is abnormally high, a float in said auxiliary housing, a switch adapted to be opened by a raising movement of said auxiliary float, and circuit means connecting said switch and solenoid valve in series with a source of current whereby said solenoid valve is closed when said switch is opened to shut off the supply of fluid to said chamber.

2. For use with an apparatus wherein a first fluid is co-mingled with a second fluid in quantitative proportion to variations in supply of the second fluid, a fluid metering unit comprising a housing having a fluid chamber therein, metering means within said fluid chamber for receiving an amount of said first fluid proportional to the level of fluid in said fluid chamber, float means including a float mounted in said fluid chamber to vary the amount of said first fluid therein, co-acting magnetic means mounted on said float and said housing operable to hold said float in any one of a plurality of levels within said fluid chamber, circuit means including said magnetic means, and means connected in said circuit and responsive to variations in supply demanded by the apparatus of said second fluid for varying the flow of current in said magnetic means in proportion to said demand, whereby the supply of said first fluid is in proportion to the demand of said second fluid.

References Cited in the file of this patent

UNITED STATES PATENTS

| 1,140,064 | Rakestran | May 18, 1915 |
| 1,583,238 | Scudder | May 4, 1926 |
| 1,722,768 | Schnetzler | July 30, 1929 |
| 1,858,557 | Piatt | May 17, 1932 |
| 2,366,404 | Hintze et al. | Jan. 2, 1945 |
| 2,698,744 | Holthouse et al. | Jan. 4, 1955 |

FOREIGN PATENTS

| 118,561 | Norway | Feb. 6, 1947 |